(12) United States Patent
Sturm et al.

(10) Patent No.: US 11,686,131 B2
(45) Date of Patent: Jun. 27, 2023

(54) ACTUATING DRIVE FOR MOTOR VEHICLE APPLICATIONS

(71) Applicant: Kiekert AG, Heiligenhaus (DE)

(72) Inventors: Christian Sturm, Krefeld (DE); Claus Töpfer, Sindelfingen (DE)

(73) Assignee: Kiekert AG, Heiligenhaus (DE)

( * ) Notice: Subject to any disclaimer, the term of this patent is extended or adjusted under 35 U.S.C. 154(b) by 336 days.

(21) Appl. No.: 16/494,326

(22) PCT Filed: Mar. 2, 2018

(86) PCT No.: PCT/DE2018/100187
§ 371 (c)(1),
(2) Date: Sep. 23, 2019

(87) PCT Pub. No.: WO2018/166558
PCT Pub. Date: Sep. 20, 2018

(65) Prior Publication Data
US 2020/0087952 A1 Mar. 19, 2020

(30) Foreign Application Priority Data
Mar. 16, 2017 (DE) ...................... 10 2017 105 657.2

(51) Int. Cl.
*E05B 81/06* (2014.01)
*E05B 81/16* (2014.01)
*B60K 15/05* (2006.01)
*E05B 77/26* (2014.01)
(Continued)

(52) U.S. Cl.
CPC .............. *E05B 81/06* (2013.01); *E05B 81/16* (2013.01); *B60K 2015/0576* (2013.01);
(Continued)

(58) Field of Classification Search
CPC .......... E05B 81/06; E05B 81/16; E05B 81/25; E05B 77/26; E05B 2015/0496; B60K 2015/0576
See application file for complete search history.

(56) References Cited

U.S. PATENT DOCUMENTS 5,921,594 A * 7/1999 Bendel .................... E05B 77/26
292/216
8,955,889 B2 * 2/2015 Bendel .................... E05B 81/20
292/201
(Continued)

FOREIGN PATENT DOCUMENTS

DE 102007055413 A1 5/2009
DE 102008011545 A1 9/2009
(Continued)

OTHER PUBLICATIONS

International Search Report and Written Opinion for corresponding Patent Application No. PCT/DE2018/100187 dated Jun. 18, 2018.
(Continued)

*Primary Examiner* — Kristina R Fulton
*Assistant Examiner* — James E Ignaczewski
(74) *Attorney, Agent, or Firm* — Renner, Otto, Boisselle & Sklar, LLP

(57) ABSTRACT

An actuating drive for motor vehicle applications, in particular for a motor vehicle lock comprising an actuating drive, for realizing different functional positions, includes an electromagnetic rotary actuator with a rotor and a stator, in particular a coil carrier, a drive lever, wherein the drive lever can be moved to different functional positions by the rotary actuator, and means for latching the drive lever in the functional position, wherein the drive lever interacts with a switching lever in such a way that, after a functional position of the drive lever is reached, a moment which stabilizes the
(Continued)

functional position can be introduced into the drive lever by the switching lever.

16 Claims, 2 Drawing Sheets

(51) Int. Cl.
*E05B 81/24* (2014.01)
*E05B 15/04* (2006.01)

(52) U.S. Cl.
CPC ............... *E05B 77/26* (2013.01); *E05B 81/25* (2013.01); *E05B 2015/0496* (2013.01)

(56) References Cited

U.S. PATENT DOCUMENTS

| | | | | |
|---|---|---|---|---|
| 9,677,305 B2 * | 6/2017 | Bendel | ..................... | E05B 81/14 |
| 10,337,214 B2 * | 7/2019 | Topfer | ..................... | E05B 77/06 |
| 2002/0089188 A1 | 7/2002 | Edgar | | |
| 2017/0089103 A1 * | 3/2017 | Ottino | ..................... | E05B 81/16 |
| 2018/0355643 A1 * | 12/2018 | Taurasi | ................... | E05B 81/16 |

FOREIGN PATENT DOCUMENTS

| | | |
|---|---|---|
| DE | 102012003698 A1 | 8/2013 |
| DE | 102015113122 A1 | 2/2017 |
| EP | 1785560 A2 | 5/2007 |
| JP | H09273341 A | 10/1997 |
| WO | 2012/139544 A1 | 10/2012 |

OTHER PUBLICATIONS

International Preliminary Report on Patentability, and English translation thereof, for corresponding Patent Application No. PCT/DE2018/100187 dated May 17, 2019.

* cited by examiner

ACTUATING DRIVE FOR MOTOR VEHICLE APPLICATIONS

The invention relates to an actuating drive for motor vehicle applications, in particular a motor vehicle lock with an actuating drive for realizing different functional positions, having an electromotive rotary actuator with a rotor and a stator, in particular a coil carrier, a drive lever, wherein the drive lever can be moved to different functional positions by means of the actuating means, and means for latching the drive lever in the functional position.

An actuating drive of the structure described above is described in DE 10 2015 113 122 A1. An electromagnetic rotary actuator is used there, wherein the electromotive rotary actuator comprises a stator with a coil arrangement and a magnetizable rotor element. The disclosed non-contact rotary actuator generates a rotational movement by means of induced electric fields, which are generated by means of coils on a U-shaped stator. By arrangement of a plurality of coils, a differently oriented electric field can be achieved in this case. The rotor element in this case comprises a magnetizable rotor, wherein the rotor can be oriented with respect to the induced electric field of the coil arrangement. The rotor element in this case comprises a shaft arrangement on which a number of cams are formed by means of which different actuating movements can be achieved by means of the actuating unit. If the actuating unit is used, for example, for a motor vehicle lock, different settings in the motor vehicle lock can be set by means of the cams and/or additional lever arrangements. Settings which may be considered here are, for example, electric opening, locking, theft-proofing or child-proofing. The rotor element is oriented around its axis by means of the induced magnetic fields, so that different functional positions of the rotor element can be realized. To stabilize the rotor element, the actuating drive has latching means, in which a spring-loaded lever interacts with cams on the shaft of the rotor element, so that stable functional positions can be achieved.

Another motor vehicle application and in particular a motor vehicle lock with an electromagnetically acting actuating means has become known from DE 10 2012 003 698 A1. A permanent magnet formed as a rotor shaft is rotatably accommodated in a coil arrangement, wherein magnetic fields can be induced by means of the coil arrangement and the rotor shaft can be oriented in different functional positions by means of the magnetic fields. The arrangement of coil pairs provides the possibility of orienting the rotor shaft and an actuating element arranged on the rotor shaft. By means of the homogeneous magnetic fields generated by means of the coil arrangements, the rotor element can be brought into different functional positions, wherein intermediate positions are also made possible. The control circuits for the coil arrangements are designed as driver circuits and in particular as half-bridges, wherein the control circuit is designed such that a stationary current supply takes place. This means that it is possible to approach the drive positions which correspond to the corresponding control positions of the actuating element without the need for an end stop or the like. The driver circuit is designed as an H-bridge circuit and functions with conventional switches, in particular integrated semiconductor switches. A comutator required for conventional electric motors can thus be dispensed with.

The prior art is not convincing in all aspects. For example, it is important, especially when using an actuating drive in a motor vehicle application and preferably in a motor vehicle lock, that the different functional positions must be approached precisely and can securely assume a permanent functional position. This problem arises in particular when using an electromagnetic actuating element which is formed without stops, since on the one hand a continuous current supply to the coil arrangements is necessary and, moreover, forces acting on the actuating element from outside only have to overcome the magnetic field to move the rotor element or actuating element out of the functional position. If a secure functional position is achieved with a releasable latching connection, for example a cam and a spring-loaded lever, the releasable latching connection must also be overcome when the rotor element moves out of the functional position. Here, the invention aims to provide a total remedy.

The invention is based on the technical problem of further developing such an actuating drive for motor vehicle applications that the individual functional positions can be predetermined and maintained in a reproducible and defined manner with the least possible outlay on construction.

The solution to this problem and thus the object of the invention is achieved by the features of the independent claim 1. Advantageous embodiments of the invention are specified in the subclaims. It should be noted that the embodiments described below are not restrictive, but rather any possible variations of the features described in the description, the subclaims and the drawings are possible.

According to claim 1, the object of the invention is achieved in that an actuating drive for motor vehicle applications, in particular a motor vehicle lock with an actuating drive, is provided for the realization of different functional positions, comprising an electromotive rotary actuator, with a rotor and a stator, in particular a coil carrier, a drive lever, wherein the drive lever can be moved to different functional positions by means of the actuating means, and means for latching the drive lever in the functional position, wherein the drive lever interacts with a switching lever such that after a functional position of the drive lever is reached, a moment which stabilizes the functional position can be introduced into the drive lever by means of the switching lever. Due to the design of the actuating drive according to the invention, the possibility is now created, on the one hand, of realizing a stable functional position which is made permanently secure by means of the additional moment by means of the actuating drive and, on the other hand, to provide easy positioning of the rotor element with respect to the drive lever. In particular, the drive lever is driven directly, so that no additional latching means are necessary to allow a functional position of the drive lever in a secure positioning.

The actuating drive for motor vehicle applications can be used to realize different functional positions of an actuating means. Thus, means for locking compartments or flaps are possible, the display of functional positions, for example, is locked or unlocked, the use of the actuating drive as a means for opening, such as a flap or door, and preferably use in a motor vehicle locking system. In a motor vehicle locking system, the actuating means can, for example, directly move the drive lever and thus can set electric opening, locking, theft-proofing, child-proofing or similar functions in the motor vehicle. As a functional position, the end position of the drive lever is then described, wherein, for example, the motor vehicle lock is in a locked position. By actuation of the actuating drive, the drive lever can then be moved to a further functional position, in which the motor vehicle lock is then unlocked, for example.

The electromotive rotary actuator has a coil body which can be described as U-shaped, which preferably has a soft magnetic core and serves as a coil carrier. The coil windings are modular, for example, constructed as separate components, for example, from coil carrier and winding, and arranged on the coil carrier. In this case, the coils can be energized such that an electric field is inducible. Depending on the current direction in the coil windings, a different polarization of the positive conducting element or the coil carrier can take place. Preferably, the rotor element of the rotary actuator is rotatable and preferably arranged on a shaft in the coil carrier. In this case, the rotor element may be present on a diametrically magnetized permanent magnet, wherein the permanent magnet adjoins the coil carrier or the positive conducting element while achieving the smallest possible gap dimension. The rotor element or the permanent magnet can then be oriented for rotation in the direction of the polarized flux guide element or the coil carrier.

Depending on the current direction and polarization of the flux-conducting element, an alignment of the rotor element can then be generated parallel to the flux-conducting element. The flux conducting element can serve directly as a coil carrier and stator of the electromagnetic rotary actuator. The rotor itself is formed from the permanent magnet and the permanent magnet bearing shaft. Thus, an electromagnetic rotary actuator can be achieved, which can assume at least two different functional positions. Depending on the number of coil carriers and coil windings, however, several functional positions can also be assumed by means of the electromagnetic rotary actuator.

A drive lever, which serves for transmitting the electromagnetically generated torque on a switching lever, is arranged directly with the rotary actuator and/or the shaft of the rotor. The drive lever in this case can be designed as a lever with a lever arm, but also for example as an eccentric element, preferably an eccentric disk. By means of the actuating movement generated by the rotary actuator into the different functional position, the drive lever can then be moved to different functional positions.

The drive lever in turn is engaged with a switching lever. In this case, the drive lever interacts with the switching lever such that by means of the switching lever and in particular in the functional position, a moment can be introduced into the drive lever. The moment acts from the switching lever on the drive lever and stabilizes the position of the drive lever in the functional position. In other words, an energization of the electromagnetic rotary actuator in the achieved functional position can be dispensed with. The functional position of the drive lever is stabilized by the moment introduced into the drive lever by means of the switching lever. The drive lever reaches a stable functional position, so that no further forces or moments have to be introduced by means of the rotary actuator into the drive lever to achieve a secure positioning of the switching lever in the functional position.

Preferably, the drive lever is accommodated pivotably on the rotary actuator. A pivotable arrangement of the drive lever allows a fast movement of the drive lever and thus a quick switching or selection of a functional position of the drive lever. This may be advantageous, in particular in applications in the motor vehicle lock, if, for example, in the event of an accident, a motor vehicle lock has to be transferred from an unlocked position into a locked position. A pivotable arrangement is also advantageous if the drive lever is designed, for example, as an eccentric disk, so that movements can be transmitted on a circular path by means of the drive lever or drive means.

In one embodiment of the invention, there is an advantage when the drive lever interacts in the functional position with a stop. The use of a stop serves to further stabilize the drive lever in the functional position. In this case, the stop may be arranged on the rotary actuator, or a housing of the actuating drive, such as the switching lever. In this case it is important for the function of the stop that the drive lever is transferred into its functional position when the stop is reached. The functional position corresponds to the position of the drive lever, in which the drive lever rests against the stop. The stop can also be designed as a buffer element, for example an elastic buffer element.

If the stabilizing moment acts at least partially in the direction of the stop, this results in a further advantageous embodiment of the invention. The position of the drive lever can be secured by a construction in which the moment acts on the drive lever via the switching lever. The securing of the position is greater, the greater the moment acting in the direction of the stop is. In this case, the force from the switching lever acts on the drive lever such that a breakdown of the moment takes place in a first component which acts in the direction of the bearing of the drive lever, in particular the rotor shaft and a second component which acts in the direction of the stop. Preferably, the first force component is greater than the second component. In other words, the main force from the switching lever acts in the direction of the rotor shaft and a lower force compared to the first component acts in the direction of the stop of the drive lever.

If the drive lever is then loaded from a first functional position, in which the drive lever is loaded in the direction of a first stop in the direction of the stop and, after an adjustment of the drive lever into a further functional position, in turn is loaded by a moment acting in one direction of the stop, this produces secure end positions for the drive lever in the functional positions. The interaction between the switching lever and drive lever in the respective functional positions creates the possibility of achieving secure end positions by mechanical means. In other words, a mechanical flip-flop is generated.

Advantageously, the switching lever can be accommodated pivotably in, for example, the motor vehicle lock. A pivotable mounting allows an easy and structurally favorable interaction between the drive lever and the switching lever. In particular, the switching lever is easily pivoted by means of the drive lever. In addition, favorable leverage between the drive lever and the switching lever can be adjusted, so that in turn a structurally favorable design of the electromagnetic drive is made possible.

A further embodiment of the invention results when the switching lever is positionable by means of the drive lever. The pivotable design of the switching lever in interaction with the drive lever allows a structurally favorable positioning of the switching lever. In particular, a very accurate, quick and low-noise positioning of the switching lever can be realized by an interaction of a pivotally mounted drive lever with a pivotably mounted switching lever. The pivotable mounting also allows a structurally favorable embodiment for introducing the forces of the drive lever onto the switching lever. In particular, the drive torque provided by the electromagnetic rotary actuator can be used optimally for adjusting the switching lever.

If the switching lever interacts with a spring element, wherein a force can be introduced into the drive lever by means of the spring element, this results in a further advantageous embodiment of the invention. By means of a spring element, a positioning of the switching lever can be stabilized and/or the movement of the switching lever can be assisted in an advantageous manner. In a preferred embodiment, the spring element acts in a functional position on the switching lever such that a moment can be generated in the direction of the drive lever. In other words, a force is generated on the drive lever by means of the spring element.

If the spring element is designed, for example, as a center-zero spring, a moment can be generated in different directions on the switching lever by means of only one spring element. For example, if a first stop for a spring leg is arranged on the housing, for example, a motor vehicle lock, and another stop for another spring leg of the spring element is arranged on the switching lever, in each case in the functional positions a moment can be transmitted via the spring element to the switching lever. Thus, by means of the center-zero spring thus an additional moment can be introduced into the drive lever in each functional position of the switching lever or the drive lever.

In one embodiment, the actuating drive is part of a motor vehicle lock, wherein the switching lever can be brought into engagement with a further lever of the lock, in particular a clutch lever. The interaction of the switching lever with a clutch lever creates the possibility of setting other functions in the lock, such as locking or unlocking, by means of the switching lever. Of course, this embodiment is not limiting, but merely shows an embodiment in which the switching lever interacts with a clutch lever to achieve a setting of the lock. By means of the switching lever, however, settings can also be made directly on the lock or, for example, a linear movement of a lever can be initiated.

If the drive lever has, at least partially, an in particular cylindrical contour, wherein the switching lever can be guided by means of the contour, at least partially, this produces a further embodiment variant of the invention. By the formation of cylindrical engagement surfaces or engagement surfaces formed with a radius between the switching lever and the drive lever, a low-noise adjustment of the switching lever can be achieved.

In addition to the low-noise adjustment of the switching lever, the formation of contours which are cylindrical or provided with a radius offers the possibility of a uniform guidance of the switching lever. In particular, different force application surfaces and/or moments between the drive lever and the switching lever can be realized by the formation of the contours, so that in an advantageous manner, on the one hand, a secure positioning in the functional positions can be achieved and, on the other hand, the force ratios between the drive lever and switching lever are very precisely adjustable relative to one another. This offers an advantage, in particular, if different forces can be transmitted from the drive lever to the switching lever by means of the magnetic actuating means. In fact, thus, a very accurate adjustment of the engagement torque between the drive lever and the switching lever can be made in coordination with that provided by the electromagnetic rotary actuator. Thus, in addition to a secure positioning and a structurally favorable interpretation of the force ratios in the actuating means can be achieved.

The invention will be explained in more detail below with reference to the accompanying drawings with reference to a preferred embodiment. However, the principle that the embodiment does not limit the invention, but merely represents an embodiment, is applicable. The illustrated features may be performed individually or in combination with other features of the specification as well as the claims individually or in combination.

Figure 1:
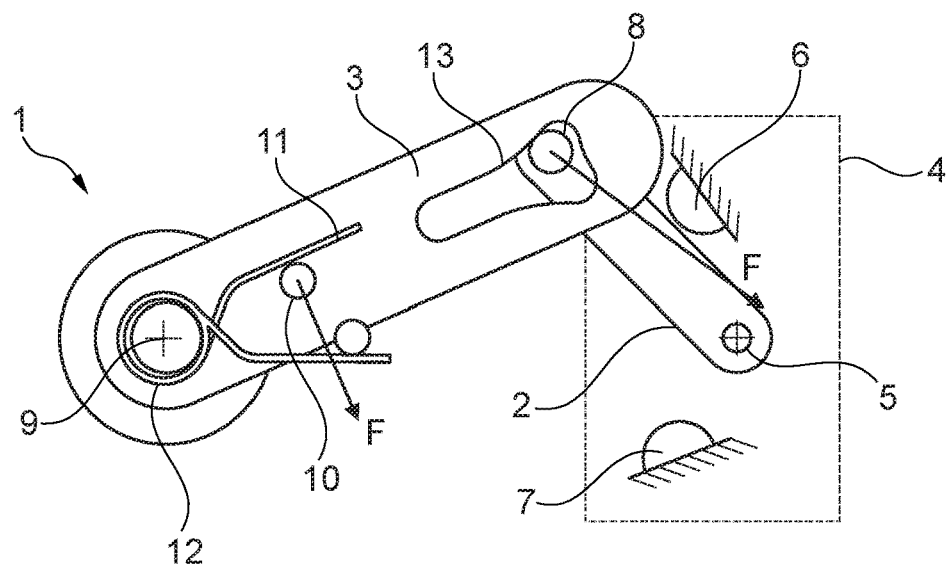
FIG. 1 shows a schematic representation of an actuating drive.

FIG. 1 shows an actuating drive 1 for a motor vehicle application in a basic representation. The actuating drive 1 has a drive lever 2 and a switching lever 3 as essential components. An electromagnetic rotary actuator 4 is shown, only indicated by dashed lines. The drive lever 2 is fastened to the electromagnetic rotary actuator 4 and in particular to a rotor shaft 5 of the electromagnetic rotary actuator 4. The drive lever 2 can be moved in particular by means of the rotor shaft 5 from the position shown in FIG. 1 in the counterclockwise direction. The drive lever 2 abuts against a stop 6 and can be pivoted in the counterclockwise direction against a further stop 7. The drive lever 2 in turn has a guide lug 8, which may be described as cylindrical and is in engagement with the switching lever 3.

The switching lever 3 is accommodated, for example, in a housing of a motor vehicle lock so as to be pivotable about the axis 9. A cylindrical pin 10, which engages with a first spring leg 11 in the position shown, is, in turn, fastened to the switching lever 3. By means of the first spring leg 11 of a leg spring 12, a force F can be introduced into the switching lever 3. The force F is transmitted by means of the switching lever 3 onto the guide cam 8 of the drive lever 2. As can be seen clearly in FIG. 1, the force vector of the switching lever 3 acts on the rotor shaft 5, so that, on the one hand, a force vector acts in the direction of the rotor shaft 5 and a lesser part of the force F acts as a force vector in the direction of the stop 6. This lesser part of the force vector, which acts in the direction of the stop 6, stabilizes the position of the drive lever 2 in the position shown in FIG. 1. Thus, by means of the force from the switching lever 3 the position of the drive lever 2 is secured. In fact, the force component of the force F, which acts in the direction of the stop 6, secures the drive lever 2 in its functional position.

If the drive lever 2 is moved counterclockwise by means of the electromagnetic rotary actuator 4, then the switching lever 3 moves in the direction of the arrow P in the clockwise direction. In this case, the guide cam 8 slides along a guide contour 13 of the switching lever 3 and adjusts the switching lever. Due to the continuous engagement between the guide cam 8 and the guide contour 13, a backlash-free movement of the switching lever can be ensured and at the same time a low-noise movement is achieved. After an adjustment of the switching lever 3 by means of the drive lever 2, the drive lever 2 arrives against the stop 7. The stop 6, 7 may be formed, for example, on a lock housing or on the electromagnetic rotary actuator.

Figure 2:
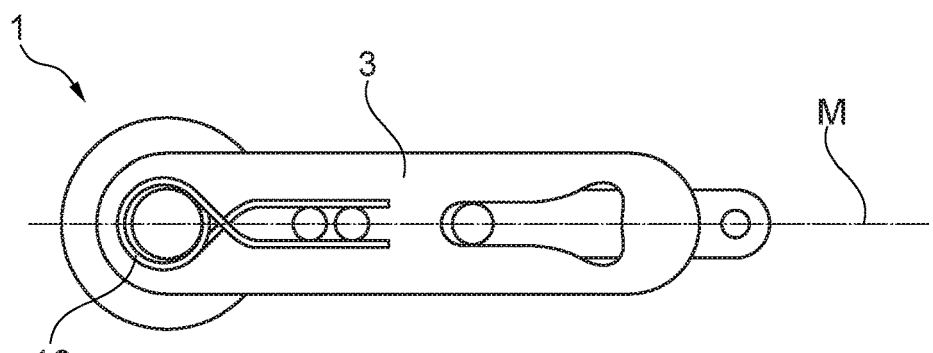
FIG. 2 shows a schematic representation of an actuating drive.
Figure 3:
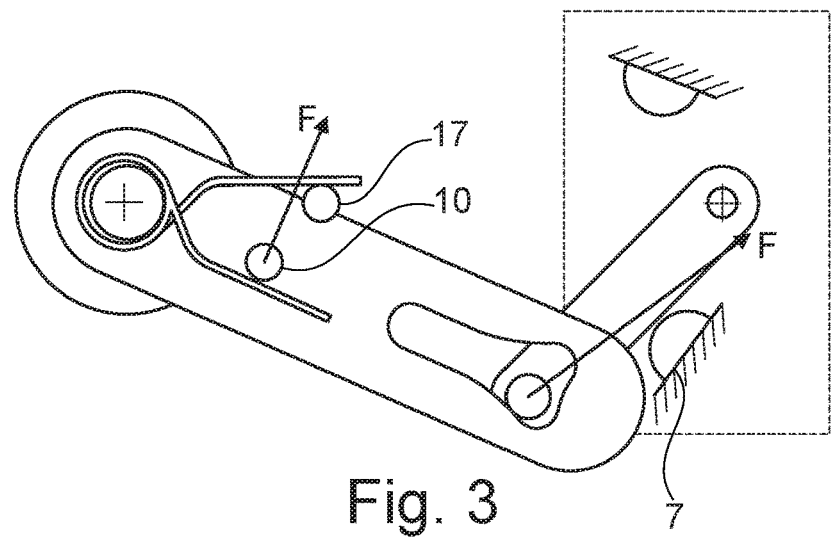
FIG. 3 shows a schematic representation of an actuating drive.
Figure 4:
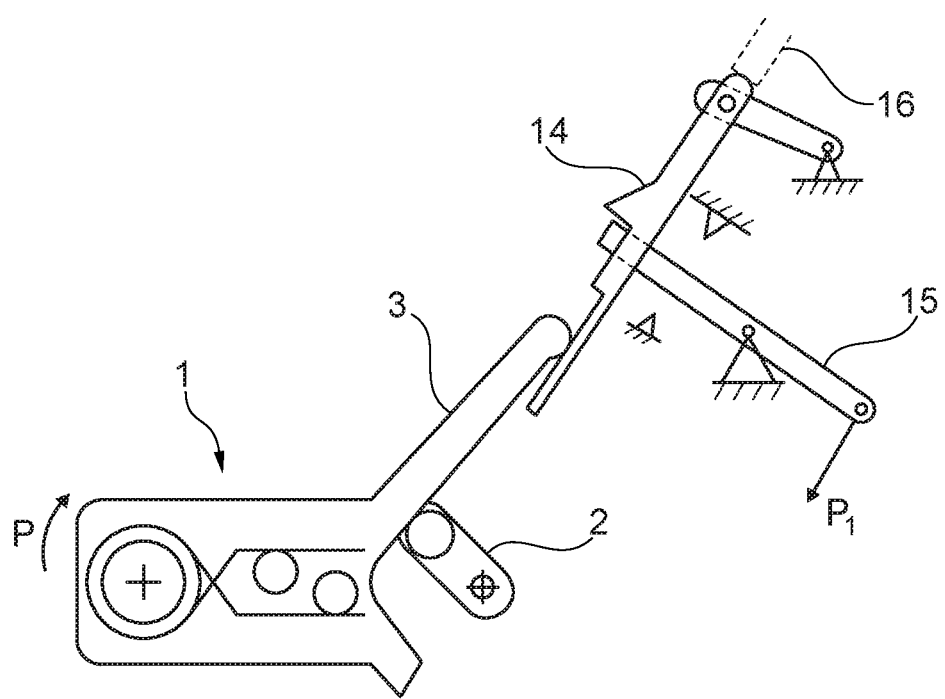
FIG. 4 shows a schematic representation of an actuating drive for a motor vehicle application consisting of drive lever and switching lever.

In FIG. 2, the actuating drive 1 according to the FIG. 1 is shown in conjunction with a clutch lever 14. The switching lever 3 is in operative connection with the clutch lever 14. The clutch lever 14 in turn can be brought into engagement with an operating lever 15, which may be, for example, an external operating lever. By operation of the actuating lever 15 in the direction of the arrow P1, the clutch lever 14 is displaceable, so that in turn, for example, a pawl 16 can be deflected. Thus in the case of the engaged clutch, as shown in FIG. 2, a locking mechanism can be unlocked by operation of the operating lever 15.

If now by means of the drive lever 2, the switching lever 3 is pivoted clockwise, the clutch lever 14 is disengaged from the operating lever 15. The operating chain consisting of operating lever 15, clutch lever 14 and pawl 16 is interrupted. An operation of the pawl 16 is prevented, so that a locked state can be set by means of the switching lever 3. It should be noted that only one embodiment of a use of an actuating drive 1 is shown here. Of course, linearly adjustable actuating elements can be moved by means of the switching lever 3. By using the arrangement according to the invention between the drive lever and the switching lever, a secure positioning of a switching lever 3 can be realized, without the need for a continuous power supply to the electromagnetic rotary actuator 4 is required.

LIST OF REFERENCE SIGNS 1 actuating drive
2 drive lever
3 switching lever
4 electromagnetic rotary actuator
5 rotor shaft
6, 7 stop
8 guide cam
9 axis
10 cylindrical-pin
11 spring-leg
12 leg spring
13 guide contour
14 clutch lever
15 operating lever
16 pawl
F force

The invention claimed is:

1. An actuating drive for a motor vehicle, the actuating drive comprising:
an electromagnetic rotary actuator having a rotor;
a drive lever movable between a first end position and a second position by the rotary actuator; and
a switching lever, wherein, after the first end position of the drive lever is reached, the switching lever causes a moment on the drive lever which stabilizes the drive lever in the first end position,
wherein the drive lever is accommodated to be pivotable about a first axis, the first axis being an only rotational axis for the drive lever,
wherein the switching lever is mounted pivotably about a second axis and is configured for latching of the drive lever when in the end position,
wherein the drive lever has a guide cam,
wherein the switching lever has a guide contour in which the guide cam is engageable,
wherein the drive lever directly contacts a first stop when in the first end position;
wherein the switching lever is positioned relative to the drive lever such that when the drive lever is in the first end position, the moment includes a first force component which acts in a direction toward the rotor, and a second force component which acts in a direction toward the first stop that stabilizes the drive lever in the first end position, and the first force component is greater than the second force component; and
wherein the switching lever interacts with a spring element, and the spring element is used to exert the moment onto the drive lever wherein the switching lever is engageable with a clutch lever, and further comprising an operating lever that is engageable with the clutch lever.

2. The actuating drive according to claim 1, wherein the drive lever is configured to be accommodated pivotably on the rotary actuator.

3. The actuating drive according to claim 1, wherein the switching lever is positionable by the drive lever.

4. The actuating drive according to claim 1, wherein the spring element is a center-zero spring.

5. The actuating drive according to claim 1, wherein the guide cam of the drive lever is cylindrical in shape.

6. The actuating drive according to claim 5, wherein the guide cam is a guide lug.

7. The actuating drive according to claim 1, wherein the first stop is formed on the rotary actuator.

8. The actuating drive according to claim 2, wherein the drive lever is fastened to the rotor of the rotary actuator.

9. The actuating drive according to claim 1, wherein the guide cam is continuously engageable along the guide contour of the switching lever.

10. The actuating drive according to claim 1 further comprising a cylindrical pin that is fastened to the switching lever and is engageable with the spring element.

11. The actuating drive according to claim 10, wherein the spring element is a leg spring and the cylindrical pin is engageable with a first spring leg of the leg spring.

12. The actuating drive according to claim 1, wherein the first axis and the second axis are spaced.

13. The actuating drive according to claim 1, wherein the guide contour is elongated along an elongated length of the switching lever.

14. The actuating drive according to claim 1 further comprising a second stop against which the drive lever is engageable when in the second end position.

15. The actuating drive according to claim 1, wherein the drive lever is formed as a unitary part that is both accommodated on the first axis and includes the guide cam.

16. An actuating drive for a motor vehicle, the actuating drive comprising:
an electromagnetic rotary actuator having a rotor;
a drive lever movable between a first end position and a second position by the rotary actuator; and
a switching lever, wherein, after the first end position of the drive lever is reached, the switching lever causes a moment on the drive lever which stabilizes the drive lever in the first end position,
wherein the drive lever is accommodated to be pivotable about a first axis, the first axis being an only rotational axis for the drive lever,
wherein the switching lever is mounted pivotably about a second axis and is configured for latching of the drive lever when in the end position,
wherein the drive lever has a guide cam,
wherein the switching lever has a guide contour in which the guide cam is engageable,
wherein the drive lever directly contacts a first stop when in the first end position;
wherein the switching lever is positioned relative to the drive lever such that when the drive lever is in the first end position, the moment includes a first force component which acts in a direction toward the rotor, and a second force component which acts in a direction toward the first stop that stabiltizes the drive lever in the first end position, and the first force component is greater than the second force component; and
wherein the switching lever is engageable with a clutch lever, and further comprising an operating lever that is engageable with the clutch lever.

* * * * *